(12) United States Patent
Lyle et al.

(10) Patent No.: US 7,883,813 B2
(45) Date of Patent: Feb. 8, 2011

(54) FUEL CELL SYSTEM VENTILATION SCHEME

(75) Inventors: William David Lyle, San Francisco, CA (US); Arne Watson Ballantine, Menlo Park, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 981 days.

(21) Appl. No.: 11/730,541

(22) Filed: Apr. 2, 2007

(65) Prior Publication Data
US 2007/0231628 A1    Oct. 4, 2007

Related U.S. Application Data

(60) Provisional application No. 60/788,044, filed on Apr. 3, 2006.

(51) Int. Cl.
*H01M 8/24* (2006.01)
(52) U.S. Cl. .............. 429/458; 429/428; 429/429; 429/452; 429/456; 429/459
(58) Field of Classification Search ............... None
See application file for complete search history.

(56) References Cited

U.S. PATENT DOCUMENTS

| | | | | |
|---|---|---|---|---|
| 5,980,726 | A * | 11/1999 | Moulthrop et al. | 205/637 |
| 6,423,437 | B1 | 7/2002 | Kenyon et al. | |
| 6,479,177 | B1 * | 11/2002 | Roberts et al. | 429/413 |
| 6,492,050 | B1 | 12/2002 | Sammes | |
| 6,787,263 | B2 * | 9/2004 | Walsh et al. | 429/410 |
| 6,828,048 | B2 * | 12/2004 | Margiott et al. | 429/420 |
| 7,452,619 | B2 | 11/2008 | Ahmed | |
| 2001/0009653 | A1 | 7/2001 | Clawson et al. | |
| 2002/0142198 | A1 | 10/2002 | Towler et al. | |
| 2003/0129462 | A1 | 7/2003 | Yang et al. | |
| 2004/0224197 | A1 | 11/2004 | Kralick | |
| 2004/0258587 | A1 | 12/2004 | Bowe et al. | |
| 2005/0164051 | A1 | 7/2005 | Venkataraman et al. | |
| 2007/0231631 | A1 | 10/2007 | Venkataraman | |
| 2007/0231635 | A1 | 10/2007 | Venkataraman et al. | |

FOREIGN PATENT DOCUMENTS

| | | |
|---|---|---|
| DE | 40 05 468 A1 | 8/1991 |
| DE | 199 24 777 A1 | 11/2000 |
| EP | 1 057 998 B1 | 11/2003 |
| EP | 1 571 726 A1 | 9/2005 |
| EP | 1 258 453 B1 | 1/2007 |
| JP | 06-104002 A | 4/1994 |
| WO | WO 00/61707 | 10/2000 |

OTHER PUBLICATIONS

Office Action received in U.S. Appl. No. 11/730,529.
Supplementary European Search Report mailed Nov. 4, 2009, received in European Application No. 07754708.1.
Office Action mailed Dec. 14, 2009, received in U.S. Appl. No. 11/730,529.

* cited by examiner

*Primary Examiner*—Patrick Ryan
*Assistant Examiner*—Cynthia Lee
(74) *Attorney, Agent, or Firm*—The Marbury Law Group PLLC

(57) ABSTRACT

A method of operating a fuel cell system includes purging heavier and lighter than air gases from a system cabinet containing at least one fuel cell stack during a single purge step, and starting-up the fuel cell system after the purging step. The system includes an air blower, a purge manifold, and a purge damper.

12 Claims, 5 Drawing Sheets

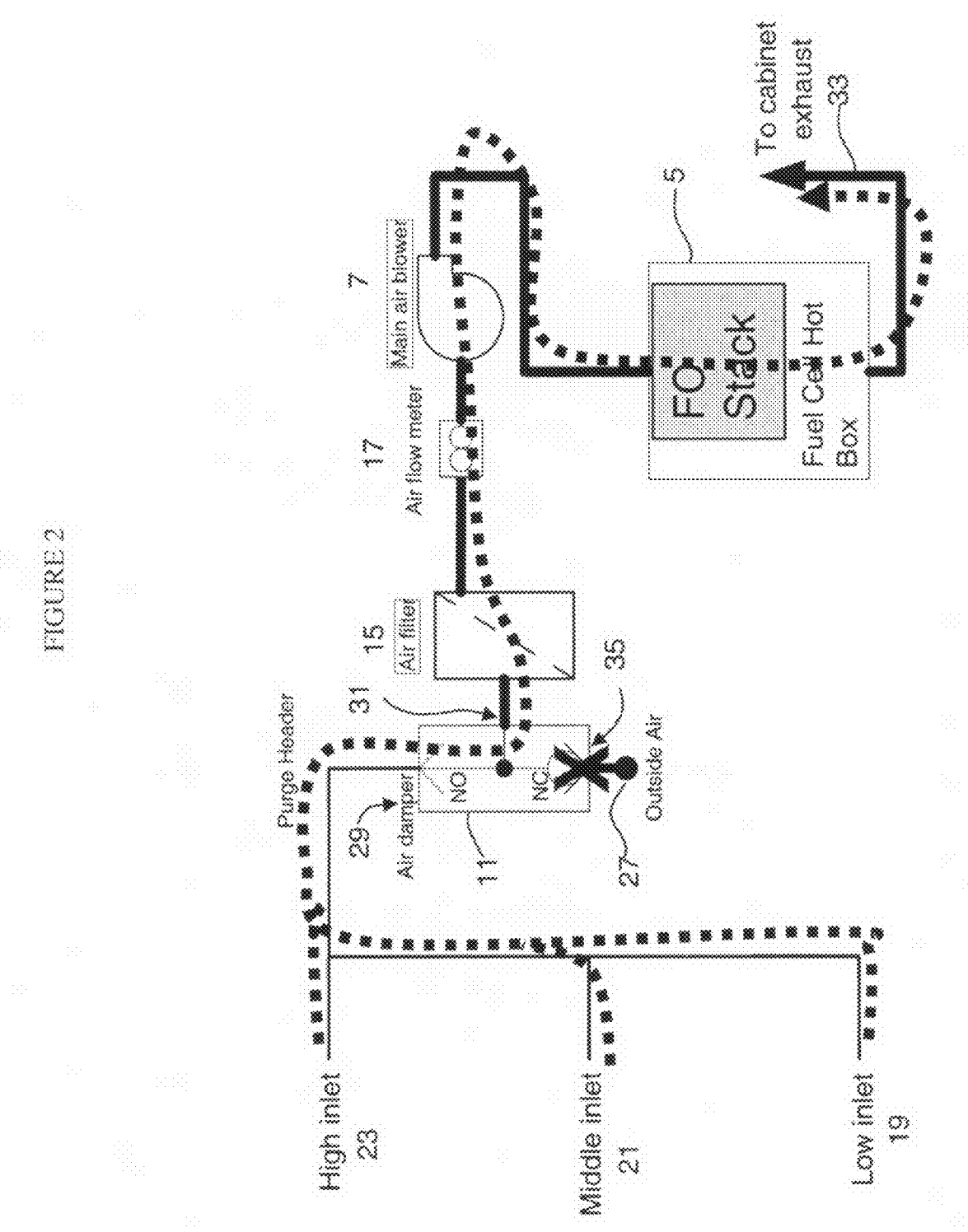

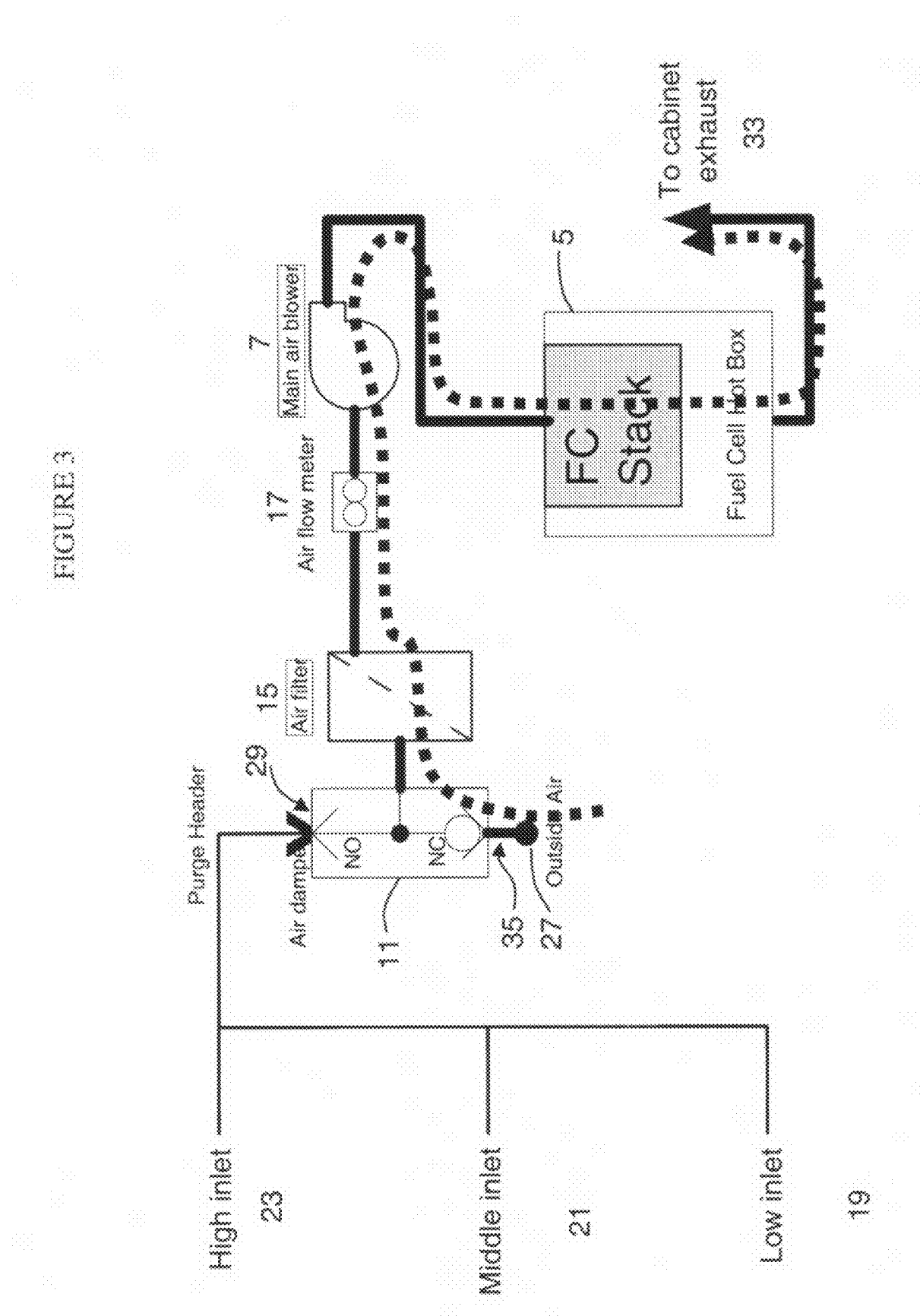

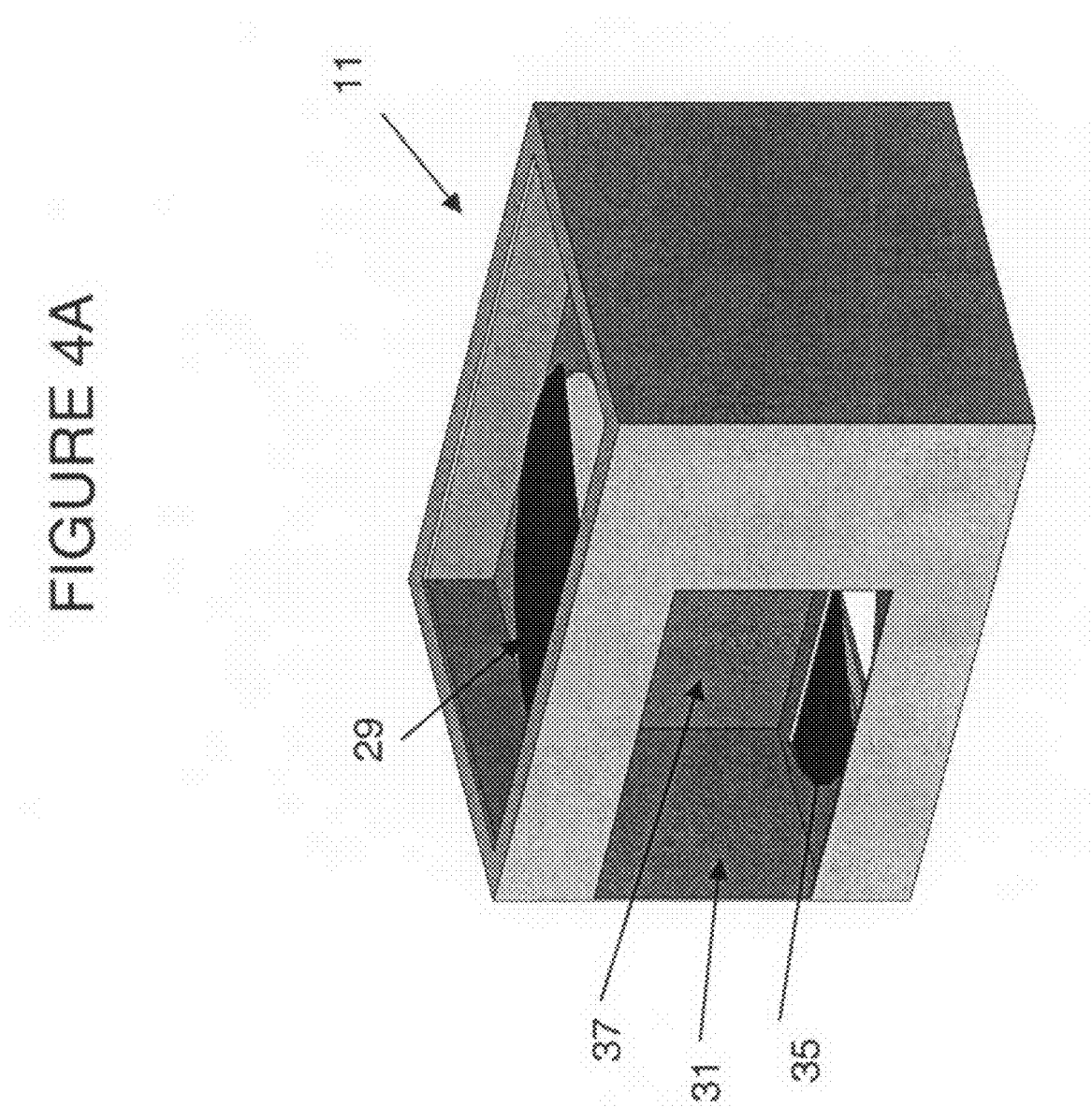

FUEL CELL SYSTEM VENTILATION SCHEME

This application claims benefit of priority of U.S. provisional application No. 60/788,044 filed on Apr. 3, 2006, which is incorporated herein by reference in its entirety.

BACKGROUND OF THE INVENTION

The present invention is generally directed to fuel cells and more specifically to balance of plant components of high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

One embodiment of the invention provides a method of operating a fuel cell system, comprising purging heavier and lighter than air gases from a system cabinet containing at least one fuel cell stack during a single purge step, and starting-up the fuel cell system after the purging step.

Another embodiment of the invention provides a fuel cell system, comprising, at least one fuel cell stack, an air blower, a purge manifold, and a purge damper.

BRIEF DESCRIPTION OF THE DRAWINGS

FIGS. 1-3 are schematics of fuel cell systems according to embodiments of the present invention.

FIGS. 4A-4D are three dimensional views of purge dampers according to embodiments of the invention.

DETAILED DESCRIPTION OF THE EMBODIMENTS

One embodiment of the invention provides a fuel cell system ventilation scheme. The fuel cell ventilation scheme can successfully purge heavier or lighter than air fumes prior to start-up. The suction points can be easily modified to allow rapid certification. The scheme allows control of the temperature of the internal cabinet for hot and cold weather installations.

In order to use electrical parts which are not hazardous area classified in a fuel cell system, a purge of the fuel cell system cabinet or housing is required. The purpose of this purge is to remove any combustible vapors from the cabinet prior to startup. The ventilation system is typically dormant while the system is shutdown and concentrations of vapors may have accumulated.

Prior art solutions include use of ventilation fans which may be explosion proof rated. These fans are used to conduct a cabinet purge prior to startup. However, in each of these cases a specific gas type—either lighter or heavier than air— is specified in the design. Thus, the ventilation fans are designed to purge lighter or heavier than air gas. Operation in a single unit with both gas types is problematic when certification codes and standards are considered.

One embodiment of the invention provides a system which can operate on lighter or heavier than air fuels and a purge scheme which can remove accumulated gases from upper and lower zones of the cabinet (i.e., the lighter than air gases from the top of the cabinet and heavier than air gases from the bottom of the cabinet).

Figure 1:
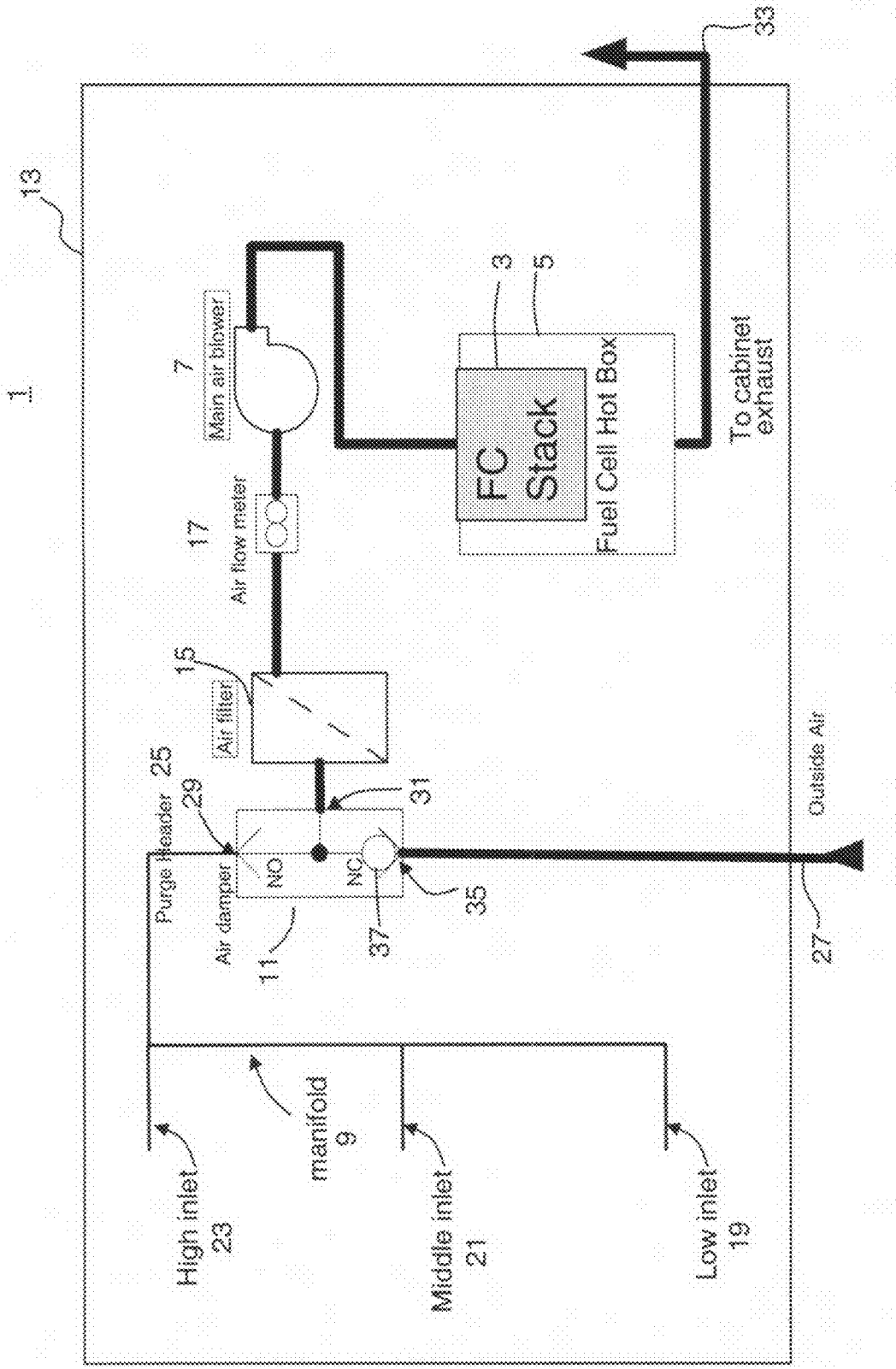

FIG. 1 below schematically illustrates the components of the system 1. The fuel cell system 1 includes at least one fuel cell stack 3 located in hot box 5, a main air blower 7, which is preferably explosion proof area classification rated, a purge manifold 9 and a purge damper 11. Preferably, these elements are located in the same cabinet or housing 13. The hot box 5 may contain plural fuel cell stacks 3, such as solid oxide fuel cell stacks and other balance of plant components, such as heat exchangers, as described in U.S. application Ser. No. 11/002,681, filed Dec. 3, 2004, incorporated herein by reference in its entirety. The system may have other optional components, such as an air filter 15 and an air flow meter 17. The output of the flow meter may be used to control the blower or other components either manually or via a computer or other electronic controller. In an alternative configuration, the air filter 15 may be placed in the path of the air intake 27 upstream of the outside air inlet 35 into the damper 11. In this configuration, air, once in the system, does not need to be filtered again.

The manifold 9 may comprise any tube or conduit which extends at least partially in a vertical direction (i.e., in a completely vertical direction or in a direction that has a vertical component, such as in a diagonal direction between vertical and horizontal) in the cabinet 13, and which contains a low inlet 19 in a lower part of the cabinet 13 where heavy gases would accumulate, and a high inlet 23 in an upper part of the cabinet 13 where light gases would accumulate. While a manifold 9 with three inlets (low 19, middle 21 and high 23) is shown, it should be understood that the manifold may have two inlets (e.g., low and high) or more than three inlets. The inlets may connect to the same manifold purge header 25 (which comprises an inlet conduit to the damper 11) or each inlet may be separately connected to the damper 11. Each inlet 19, 21, 23 can be adjusted with respect to the other inlets to preferentially draw in air from that inlet. In other words, the amount or ratio of the air being drawn into one inlet compared to the other inlets may be adjusted based on the type of fuel that is used in the system. For example, the inlets may be adjusted such that more air is preferentially drawn in from the high inlet 23 and less air is drawn from the low inlet 19 or vice versa. The adjustment may comprise a one time calibration or tuning setup, depending on if the system will operate with heavier than air fuel or lighter than air fuel. This is done by adjusting a flap or other flow restrictor to restrict a portion of the manifold hole. This adjustment may be performed one time manually based on the type of fuel the system will use (i.e., such that more air is drawn in from the high inlet 23 for systems operating on lighter than air fuel or more air is drawn in from the low inlet 19 for systems operating on heavier than air fuel). However, for a system that uses both lighter and heavier than air fuels interchangeably, the adjustment may automated, by using one or more valves or other flow restrictors, located in the manifold and/or in the manifold inlets.

The blower 7 is used to purge (i.e., blow) the lighter and heavier than air accumulated combustible vapors from the cabinet 13 through the manifold 9. The damper 11 comprises any suitable air flow direction controller which is used to switch the air flow direction between the inside to outside of the cabinet 13 ("to manifold") direction and outside to inside of the cabinet 13 direction.

The system 1 operates as follows. The purge damper is first positioned in the "to manifold" position. As shown schematically in FIG. 2, the outside air inlet 35 into the damper 11 is closed and the inlet 29 of the damper 11 into the purge header 25 portion of the manifold 9 is open. This is the de-energized position of the damper for start-up or purge operation. The main air blower 7 is energized at maximum flow and operated until sufficient air changes are completed. The purge air is drawn through each inlet 19, 21, 23 into the purge manifold 9. The manifold is designed to draw air from all regions of the cabinet 13 which could fill with flammable gas—upper, middle and lower zones—by drawing in air through the high 23, middle 21 and low 19 inlets of the manifold 9. As shown in FIG. 2, the purge air and any flammable gases flow into the manifold through the manifold inlets. The purge air and flammable gases then flow through conduits or pipes from the manifold purge header 25 into the inlet 29 of the damper 11 (marked "NO" for "normally open" in FIG. 2) connected to the manifold. The gases flow from the outlet 31 of the damper through the filter 15, flow meter 15, blower 7 and hot box 5 into the cabinet exhaust 33. The air flow is shown by dashed line in FIG. 2. Preferably, this occurs before the fuel cell system start-up (i.e., before the operation of the fuel cell stack 3 to generate electricity is initiated).

After the purge is completed, the purge damper 11 is repositioned to a normal running position where the suction air comes from outside the cabinet, as shown in FIG. 3. Thus, the "NO" inlet 29 of the damper is closed and the manifold 9 is sealed off from the damper 11. The second ("NC" for "normally closed") inlet 35 of the damper 11 connected to an outside air intake 27 is open. The air flows from air intake 27 through the "NC" inlet 35 of the damper 11 and then through the outlet 31 of the damper, the filter 15, the flow meter 17 and the blower 7 into the stack 3 located in the hot box 5. The air flow is shown by dashed line in FIG. 3. The operation of the fuel cell stack to generate electricity is then initiated, and fuel is provided to the stack.

The damper inlet markings "NO" and "NC" (which stand for "normally open" and "normally closed", respectively) indicate the position the damper 11 will take when it is de-energized. In the de-energized condition, the damper will be "normally open". This configuration, shown in FIG. 2, means that if the whole system (and hence this damper) lose power on a shut-down, the damper will go to the normally open condition where the air flow is lined up to the purge header. This is also the case during first start-up, when the only energized device may be the blower. The damper is maintained in the normally open, "to manifold" (i.e., "to purge header") position without any external power source. Therefore, the damper does not need to be rated for operation in a hazardous environment. Also, in a de-energized condition, the path for drawing air from outside the cabinet is "normally closed". In other words, this path is blocked without applying any external power to the damper. In the case of an energized condition, the damper may be positioned to block flow from the purge header, and allow air flow from the external air supply only by applying power.

Figure 4B:
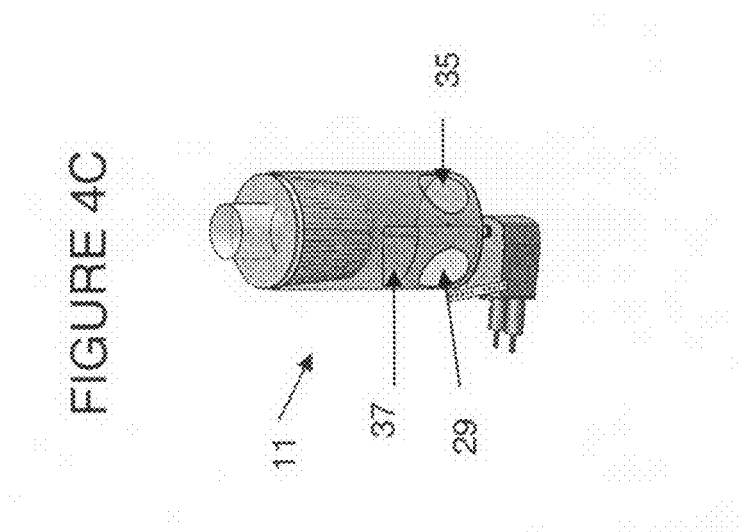
Figure 4C:
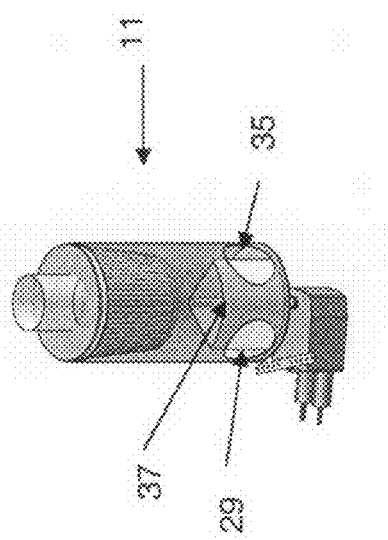

One non-limiting example of the purge damper 11 is illustrated schematically in FIG. 4A. It should be understood that other gas flow direction controllers may be used instead. FIG. 4A shows the two sealable inlets ("NO" 29 and "NC" 35) on opposite sides of the damper housing and an outlet 31 located on a third side of the damper between the two inlet sides. A power actuated shutter 37 is located inside the damper housing and is used to seal one of the inlets 29, 35. When the power is OFF, the weight of the shutter and/or a spring loaded mechanism (i.e., pressure of a spring acting on the shutter) causes the shutter 37 to close the "NC" inlet 35 to outside air and to leave the "NO" inlet 29 open. The shutter can be moved to open the "NC" inlet 35 by a signal from a system controller in the energized condition. FIG. 4B illustrates another embodiment of the purge damper 11. In this configuration, the damper housing 38 may have a cylindrical shape and the housing is preferably positioned vertically in the cabinet 13. However, the housing 38 may have a rectangular or other polygonal shape. In this embodiment, the filter 15 and the shutter 37 are located inside the damper 11 housing 38. If desired, the filter 15 may also be located outside the damper housing. The damper housing 38 is positioned over a motor or other suitable actuator 39 which is used to move the shutter 37. The inlet openings 29 and 35 are preferably located in the lower portion of the housing 38 while the outlet opening 31 is located in the upper part of the housing 38 above the filter 15. The openings 29 and 35 may be located at about a right angle with respect to each other in the wall of the housing 38, such as at an angle of 45-120 degrees, for example 90 degrees. The shutter 37 may comprise a pie or wedge shaped sheet metal or other part which rotates inside the housing to cover one of the inlet openings while leaving the other inlet opening uncovered. For example, in FIG. 4B, the shutter 37 closes opening 35 while leaving opening 29 uncovered. In FIG. 4C, the actuator 39 rotates shutter about 90 degrees to cover opening 29 while leaving opening 35 uncovered. The configuration of FIGS. 4B and 4C is advantageous because it requires the actuator 39 to rotate the shutter 37 only 90 degrees. Such actuators are more widely available than 180 degree actuators. Furthermore, this configuration is designed for in-line placement for easier packaging within the cabinet 13.

Figure 4D:
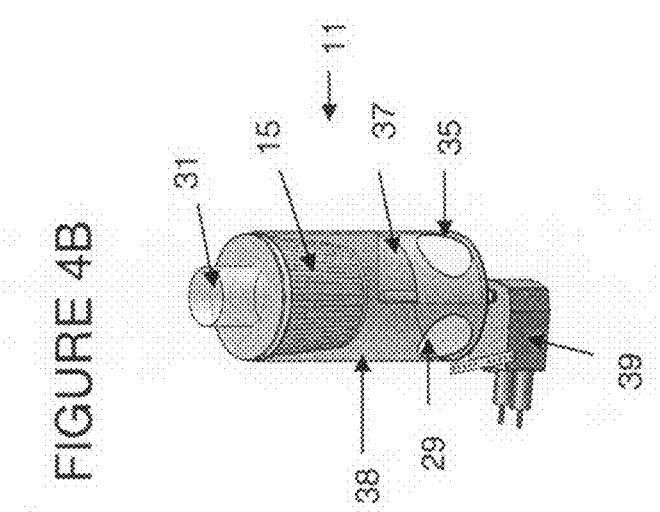

In an alternative aspect of the second embodiment, the purge damper can be positioned to draw some cabinet and some external air. This can be used in order to ensure a fixed main air blower inlet temperature and is beneficial for hot and cold temperature installations. In this case, both inlets "NO" 29 and "NC" 35 are open at the same time. For example, as shown in FIG. 4D, the shutter 37 is positioned between the inlet openings 29, 35 to leave at least a portion of both openings uncovered.

The embodiments of the invention provide an ability to have a single fuel cell module design process heavier and lighter than air fuels, the ability to rapidly modify the locations of purge air flow suction by repositioning of the purge header and the ability to control the internal cabinet temperature.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of operating a fuel cell system, comprising:
    purging heavier and lighter than air gases from a system cabinet containing at least one fuel cell stack during a single purge step; and
    starting-up the fuel cell system after the purging step;
    wherein an air blower, a purge manifold, and a purge damper are located in the system cabinet;
    wherein the step of purging comprises:
        positioning the purge damper to open a first inlet of the purge damper connected to the purge manifold and to close a second outside air inlet of the purge damper; and operating the air blower such that purge air is drawn through the purge manifold from upper, lower and middle zones of the system cabinet; and, wherein the purge manifold comprises a first inlet located in a lower zone of the system cabinet, a second inlet located in a middle zone of the system cabinet and a third inlet located in an upper zone of the system cabinet.

2. The method of claim 1, further comprising adjusting at least one of the manifold or at least one manifold inlet to adjust an amount or ratio of air being drawn into one manifold inlet compared to at least one other manifold inlet based on a type of fuel that is used in the system.

3. The method of claim 1, further comprising repositioning the purge damper to close the first inlet of the purge damper and to open the second inlet of the purge damper to a position where suction air comes from outside of the system cabinet after the purging step is completed and prior to the starting-up step.

4. The method of claim 3, wherein the step of starting-up comprises starting up the at least one fuel cell stack to generate electricity by providing fuel to the fuel cell stack and providing air to the fuel cell stack through the second inlet of the purge damper while the first inlet of the purge damper remains closed.

5. The method of claim 1, wherein the first inlet of the purge damper is automatically opened and the second inlet of the purge damper is automatically closed in case of a power outage.

6. The method of claim 1, further comprising positioning the purge damper to open a first inlet of the purge damper connected to the purge manifold and to open a second outside air inlet of the purge damper at a same time.

7. A fuel cell system, comprising:
 at least one fuel cell stack;
 an air blower;
 a purge manifold; and
 a purge damper;

wherein:
 the at least one fuel cell stack, the air blower, the purge manifold, and the purge damper are located in a system cabinet;
 the purge damper comprises a first inlet connected to the purge manifold and a second inlet connected to an outside air intake; and
 when the first inlet is open and the second inlet is closed, purge air is drawn through the purge manifold from upper, lower and middle zones of the system cabinet by the air blower; and
 the purge manifold comprises a first inlet located in a lower zone of the system cabinet, a second inlet located in a middle zone of the system cabinet and a third inlet located in an upper zone of the system cabinet.

8. The system of claim 7, wherein the air blower, the purge manifold and the purge damper are adapted in operation to purge heavier and lighter than air gases from the system cabinet during a single purge step prior to starting-up the system.

9. The system of claim 7, wherein when the first inlet of the purge damper is closed and the second inlet of the purge damper is opened, the blower provides outside air from outside of the system cabinet to the at least one fuel cell stack.

10. The system of claim 7, wherein the first inlet of the purge damper is automatically opened and the second inlet of the purge damper is automatically closed when no power is supplied to the purge damper.

11. The system of claim 10, wherein the second inlet of the purge damper is automatically closed by at least one of a weight of a shutter located in the purge damper or by pressure from a spring acting on the shutter.

12. A fuel cell system, comprising:
 a system cabinet;
 at least one fuel cell stack;
 an air blower; and
 a first means for purging heavier and lighter than air gases from the system cabinet containing the at least one fuel cell stack and the air blower during a single purge step.

* * * * *